(12) United States Patent
Kisser et al.

(10) Patent No.: US 11,720,536 B1
(45) Date of Patent: Aug. 8, 2023

(54) DATA ENRICHMENT AS A SERVICE

(71) Applicant: Amazon Technologies, Inc., Seattle, WA (US)

(72) Inventors: Lauren M Kisser, Cambridge (GB); Timothy Lawrence Harris, Cambridge (GB); Aaron Douglas Dokey, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 6 days.

(21) Appl. No.: 16/193,837

(22) Filed: Nov. 16, 2018

(51) Int. Cl.
*G06F 16/22* (2019.01)
*G06F 16/2455* (2019.01)
*G06F 9/50* (2006.01)
*G06F 9/54* (2006.01)
*G06N 20/00* (2019.01)
*H04L 9/40* (2022.01)

(52) U.S. Cl.
CPC .............. *G06F 16/22* (2019.01); *G06F 9/5027* (2013.01); *G06F 9/547* (2013.01); *G06F 16/2456* (2019.01); *H04L 63/105* (2013.01); *G06N 20/00* (2019.01)

(58) Field of Classification Search
CPC ..... G06F 16/285; G06F 16/283; G06F 16/258; G06F 16/2456; G06F 16/22; G06F 9/5027; G06F 9/547; H04L 63/105; G06N 20/00
See application file for complete search history.

(56) References Cited

U.S. PATENT DOCUMENTS

| | | | |
|---|---|---|---|
| 9,092,502 B1* | 7/2015 | Cannaliato et al. | .... G16H 10/60 |
| 2017/0060910 A1* | 3/2017 | Budhiraja et al. | ... G06F 16/258 |
| 2018/0196867 A1* | 7/2018 | Wiesmaier et al. | .. G06F 9/4881 |
| 2018/0198680 A1* | 7/2018 | Mladin et al. | ..... H04L 41/0816 |
| 2020/0042212 A1* | 2/2020 | Sokolovski et al. | G06F 11/3409 |

OTHER PUBLICATIONS

"Amazon Kinesis Data Streams: Developer Guide," © 2018 Amazon Web Services, Inc. and/or its affiliates, <https://docs.aws.amazon.com/streams/latest/dev/amazon-kinesis-streams.html>, 171 pages.

* cited by examiner

*Primary Examiner* — Jorge A Casanova
(74) *Attorney, Agent, or Firm* — Davis Wright Tremaine LLP

(57) ABSTRACT

Systems and methods for data enrichment as a service are described herein. A service provider of a computing resource service provider may provide services for enriching data with additional data. The service provider may receive a set of enrichment parameters. The enrichment parameters may be used to determine whether data obtained by the service provider is eligible for enrichment. If data is eligible for enrichment, the data may be enriched according to the enrichment parameters, thereby generating enriched data. The enriched data may be stored in association with the data.

19 Claims, 6 Drawing Sheets

DATA ENRICHMENT AS A SERVICE

BACKGROUND

In many computer systems, data is generated or otherwise obtained, transmitted, and stored. The data may be retrieved at a later point in time. In various systems, a client computer system may delegate the storage of the data to a data storage service which may be a service provider of a computing resource service provider. The data to be stored may come in various forms — for example, the client may provide the data in the form of a data object or file to be uploaded and persisted to a data storage service, or the client may provide instructions for a service to collect logging data from a data producer, which may be another computer system.

While data storage service providers provide various advantages, there may be challenges involved in the storage of data in the data storage system. For example, it may be difficult, expensive (e.g., computationally and/or financially), or even impossible to determine state information related to the system related to when the data was stored and/or generated. Accordingly, there are challenges involved in determining, at the time when data is retrieved, of context information relating to the storage of the data.

BRIEF DESCRIPTION OF THE DRAWINGS

Various techniques will be described with reference to the drawings, in which.

DETAILED DESCRIPTION

Figure 1:
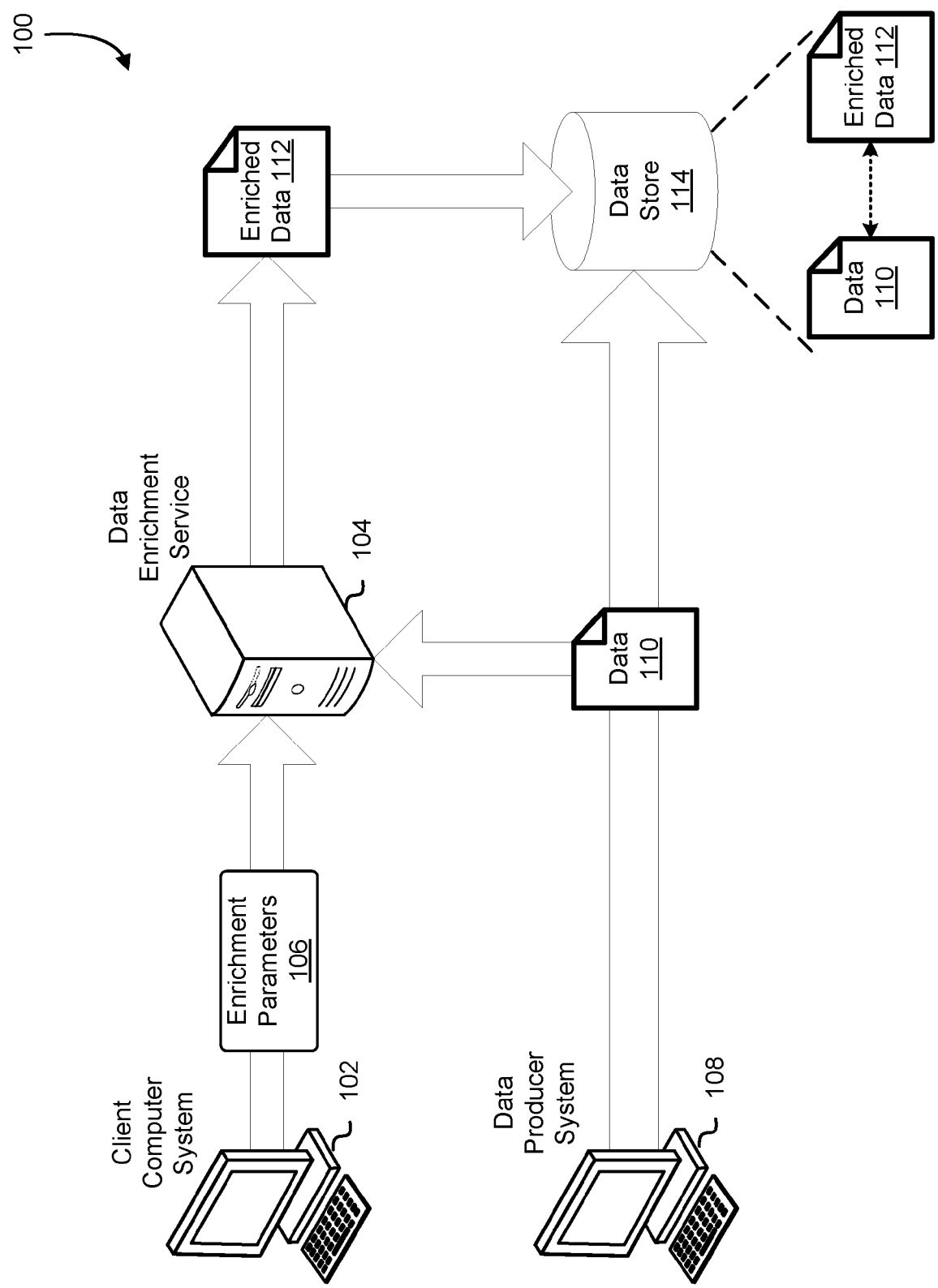
FIG. 1 shows an illustrative example of a computing environment, in accordance with at least one embodiment, in which events are detected and additional data (e.g., enriched data) is determined and stored in association with the event.

Techniques to enrich data may be utilized in various contexts and for various purposes. Data enrichment may refer to techniques that are used to define a set of rules for generating and/or storing enriched data which may, at least in some cases, be based on other data being generated or flowing through a computing environment. Consider the case where there data is being logged, that data can be enriched with additional data (i.e., enriched data) that is relevant to the data being logged. For example, the additional data may be ephemeral data that captures a state of the computing environment when the data is logged — such data may not be available or may not be easily determinable at a later point in time, such as when the logged data is inspected or is available to be inspected. Accordingly, in at least some inventions described in this disclosure, techniques described to generate enriched data are improvements to the operation of a computer system by generating data and enriched data that is coupled to the data, resulting in a new data structure that provides contemporaneous feedback in a manner that was previously not attainable.

Additionally, the operation of computer systems may be improved by reducing and/or eliminating the need for computer systems to maintain records of the temporal state of a system for the purposes of determining information related to the state of the system at the time a data entry was generated — the data storage needs of computer systems may be reduced, thereby improving the operation of computer systems that utilize techniques for data enrichment described herein. The computational efficiency of computer systems may also be improved, thereby improving the operation of a computer system, such as in cases where a computer system may need to attempt to reconstruct the state of a computer system to determine additional data or metadata from the time when log data is recorded — computer systems that utilize data enrichment techniques described herein may benefit from improved computational runtime, which may have a computational complexity of $O(1)$ — i.e., constant runtime — whereas computer systems that utilize state reconstruction techniques may have a computational complexity of $O(n)$ — i.e., linear runtime. In some cases, the average computational runtime may be reduced from $O(n \log n)$ to $O(1)$ or other ranges of reduction. Accordingly, techniques described herein for data enrichment may be utilized to improve various aspects of the operation of a computer system, such as by improving the runtime efficiency of determining certain types of data from a runtime of $O(n)$ to $O(1)$, which is faster.

A service such as a data enrichment service as described in greater detail below may be utilized to automatically enrich data queried from by a system and/or get the data from agents of data stores. Enriched data may include various types of data. For example, a log of user activity may be received from a data source or data producer and such logging data can be enriched by who a particular user reported to, their job or title, a geolocation (e.g., as determined by an IP address associated with the activity), and more. The timestamp of the log entry may also be recorded as additional data, although such data is not necessarily required in all embodiments.

In various cases, the enriched data may be data that is time relevant wherein the computer systems do not otherwise have a historical view on the data at a later point in time as to what the state of the data was at a previous point in time — for example, the system or computing environment may only have the current state of a system. As an example, the state described herein may be policy state, wherein a policy subsystem of a computing resource service provider retains currently valid policies and does not necessarily retain previously valid policies at a previous point in time, for example, policies that became invalid or were updated over time. However, even in embodiments where the historical view of the data can be determined, it may be computationally expensive to determine the historical state, which may offer poor performance or be unable to meet the computational constraints when performed at scale.

Data may be enriched by a service of a computing resource service provider as the data flows through — for example, in a data streaming service, as data is being passed through shards, the data may be inspected and enriched based on the enrichment parameters. In a data storage service, as data is being stored to a durable data storage system, the data may be enriched with additional data. A process on the system may generate an output record. In various embodiments, a streaming event pipe is attached to additional stable or static data sources which are used to enrich data going through the system, for example, based on a key or key-value mapping and a user (e.g., controlling a client computer system) writes or otherwise provides a script or other type of code that, if executed, outputs that additional data or records, or even defines a key that is automatically looked up as data flows through the event pipe.

Other uses cases may include consumer oriented applications, such as obtaining data from one source (e.g., data of an online transaction wherein goods or services are purchased) and enriching that data with additional data from another source (e.g., data from a weather service to indicate whether there is a correlation between the weather data and the purchase of a particular good or service). Another use case may be related to machine learning inference where a log comes in a query is made to a machine learning endpoint that provides a confidence interval. In the case of machine learning inference, it may be important because the model may change over time, and retaining the machine learning model from a previous point in time can be used to determine the predictions that would have occurred at a previous point in time, which is information that may not be otherwise be determinable.

As one skilled in the art will appreciate in light of this disclosure, certain embodiments may be capable of achieving certain advantages, including some or all of the following: improved computational efficiency by reducing and/or eliminating the need for computer systems to maintain records of the temporal state of a system for the purposes of determining information related to the state of the system at the time a data entry was generated.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of a computing environment 100 in accordance with at least one embodiment. In accordance with at least one embodiment, events are detected and additional data (e.g., enriched data) is determined and stored in association with the event. For example, when a client of a data storage service provider uploads a data blob to the service, additional metadata surrounding the storage request such as the IP address that the request originated may be stored. A data enrichment service that is a service of a computing resource service provider may be utilized to perform at least some of the steps included in data enrichment. In an embodiment, the data enrichment service is a standalone service, but in other embodiments, the data enrichment service is code or software that is part of another service of a computing resource service provider. In an embodiment, the data enrichment service is the data storage service (e.g., data enrichment is performed by data storage service) or a component thereof, such as a software module that is executed as part of a software application controlled by the data storage service.

In an embodiment, data enrichment is provided as a service such that information from an event is taken and bundled when the event happens to generate metadata that is stored or otherwise correlated to the event. The event may be a PUT request by a client of a data storage service to store a data blob. In an embodiment, prior to storing the data blob, additional metadata associated with the event (e.g., information regarding the type of data stored in the data blob, permissions associated with the client at the time the PUT request was submitted) may be stored by the data enrichment service. For example, when a user installs a software package a log event may be generated and the log event may cause a data enrichment service to detect the IP address of the machine for which the package is being installed, thereby generating enriched data in association with the event. The enriched data — in this example, the IP address — may be recorded in association with the event and may be utilized at a later point in time when it is impractical, computationally difficult, and/or economically expensive to determine. Accordingly, enriched data can be used to glean additional insights into user behavior and determine the answers to questions which otherwise may have been impractical or impossible to answer previously.

The client computer system 102 may be any suitable computing device and may be implemented in accordance with techniques described below in connection with FIG. 6. For example, the client computer system 102 may be an electronic client device as described in connection with FIG. 6. The client computer system 102, in an embodiment, establishes a client-server relationship with a data enrichment service 104. The client computer system 102 may be utilized to perform various tasks such as receiving (e.g., via a graphical user interface or command line interface) instructions from a customer that define enrichment parameters which are used to determine how to enrich data, what types of data to enrich, and any other such parameters that may be used to control how and when data is enriched within the context of a service of a computing resource service provider.

The data enrichment service 104 may be any suitable computing device and may be implemented as a web server or application service as described in connection with FIG. 6, or as a component thereof. The data enrichment service 104 may be implemented in accordance with techniques described below in FIG. 6. The data enrichment service 104 may receive enrichment parameters 106 from the client computer system 102. The data enrichment service 104 may be configured with executable code that, if executed, cause one or more processors of the data enrichment service to perform data enrichment related services, such as obtaining data enrichment parameters, obtaining data in connection with an event, determining enriched data, and storing the enriched data in association with the event. For example, the event may be the storage of data and the enrichment parameters may include metadata that should be persisted in association with the data being stored. In an embodiment, the client computer system 102 and the data enrichment service 104 communicate over an interface such as a web service application programming interface (API) that allows the client computer system 102 to submit a set of web API commands to the data enrichment service according to a predetermined set of supported commands having a defined format. In some cases, the data enrichment service 104 is a discrete service of a computing resource service provider. In some cases, the data enrichment service is a subsystem of another service provider of the computing resource service provider. For example, a data storage service provider may include a data enrichment subsystem that manages the enrichment of data that is stored as part of operation of the data storage service provider.

In some embodiments, the data enrichment service 104 is a serverless compute service or event-driven compute service that executes a function or logic in response to detecting satisfaction of a condition. The condition, in an embodiment, is encoded or otherwise specified in the enrichment parameters 106. For example, the enrichment parameters 106 may include a key-value mapping that indicates an attribute or data field to generate as enriched data based on the presence or absence of another data field in the data 110. In an embodiment, upon detecting that the condition is met (e.g., the particular data field is present or absent) a serverless compute service may provision a computing environment to execute a function, logic, or code specified by the enrichment parameters. For example, the serverless compute service may allocate compute resources for a virtual machine instance, provision the virtual machine instance with an operating system, software application, client SDK, or other software that is to be used in connection with execution of the serverless compute function that is to be executed in response to satisfaction of the condition. Upon provisioning the computing environment, the enrichment parameters 106 (or a portion thereof) may be provided to the computing environment as parameters to a function that is executed at least in part by using the provisioned computing environment. Upon completion of the serverless compute function (e.g., upon generation and/or storage of the enriched data 112) the computing environment may be de-provisioned by de-initializing or freeing the virtual machine instance so that compute resources may be made available to execute other serverless compute functions.

Enrichment parameters 106 may refer to data that the client computer system 102 provides to the data enrichment service 104 that defines rules for how to generate enriched data. For example, the enrichment parameters 106 may include code (e.g., SQL code) that can be executed and the result of execution (e.g., data set obtained by executing a SQL query) is the enriched data or is used as part of determining the enriched data. In an embodiment, the client computer system 102 submits a web service application programming interface (API) request that includes, as a parameter of the request, the enrichment parameters 106. As noted above, the enrichment parameters 106 may refer to data that is provided to the data enrichment service 104 to determine enriched data, and can be encoded as one or more parameters of the web service API request. The enrichment parameters 106 may be encoded within a parameter of the web service API request — for example, a web API request may include a request context parameter that is a data blob data type and a data blob (e.g., binary stream) includes the enrichment parameter data (e.g., in addition to other data).

In an embodiment, the enrichment parameters 106 are used (e.g., by the data enrichment service 104) to determine enrichment logic. Enrichment logic may refer to executable code that, if executed, is used to determine enriched data. The enrichment logic may be a key-value mapping that indicates data fields to include as part of enriched data based on the presence and/or absence of certain data fields in the data generated by the data producer system 108. The enrichment logic may be executable code that, if executed, utilizes a computing resource service provider to obtain the enriched data. The enriched data may be any data that can be joined with another data set (e.g., using a SQL JOIN clause) that has certain characteristics which may be useful at a later point in time.

A data producer system 108, in an embodiment, is a computer system that generates data 110. The data producer system may be any suitable computing device and may be implemented in accordance with techniques described below in connection with FIG. 6. In an embodiment, the data producer system 108 is a computer system that generates or otherwise makes data 110 available to the data enrichment service 104. As an example, the data producer system may be a service of a computing resource service provider that generates a data stream which is inspected by the data enrichment service 104. A data stream may refer to a stream of data that is logged in real time or under real time constraints such that the data being logged is provided within a short window (e.g., on the order of seconds or even less) of the data event occurring. The data producer system 108 may be any suitable computing entity, such as a computer server, a laptop, a mobile phone (e.g., smartphone), an embedded device, an Internet-of Things (IoT) that connects to other computing devices wirelessly, and more.

While FIG. 1 illustrates a client computer system 102 and the data producer system 108 as separate computer systems, such need not be the case. For example, the client computer system 102 may provide enrichment parameters 106 to the data enrichment service 104 and also generate the data 110 and make the data available to downstream systems such as the data enrichment service 104 and data store 114. In an embodiment, the client computer system is the data producer system (or vice versa). In an embodiment, the client computer system 102 submits a request to upload data and further includes (e.g., as part of the same web API request) enrichment parameters 106 indicating enriched data 112 that should be stored in association with the data 110. In an embodiment, a data storage service receives the storage request and stores the data 110 and also causes a data enrichment service 104 to generate enriched data 112 according to the enrichment parameters. A serverless compute service may be utilized by the data storage service to cause generation of the enriched data 112 by a serverless compute function that is executed according to the enrichment parameters 106. The serverless compute function may cause generation of the enriched data 112 by, for example, receiving the data 110, parsing the data to determine additional data to obtain, accessing the additional data by making one or more web service API calls to one or more services of a computing resource service provider, and receiving one or more responses to the one or more web service API calls that can be used to determine the additional data (e.g., additional data is included in the response).

The data store 114 illustrated in FIG. 1 may be any suitable data store such as data stores described in connection with FIG. 6. The data store 114 may be any suitable storage medium. In an embodiment, the data 110 is stored in a data storage service of a computing resource service provider. For example, the data producer system 108 may submit a web API request to store the data 110 as a data object in the data store 114. In an embodiment, data objects that are persisted to the data store 114 are organized into buckets and may be organized in a hierarchal manner (e.g., a bucket may contain other buckets, data objects, or a combination thereof).

In an embodiment, the enriched data 112 is stored in association with the data 110. The enriched data 112 may be coupled with the data 110 using various techniques. For example, the association may be an explicit association wherein a reference between the enriched data 112 and the data 110 is also persisted. For example, the enriched data 112 may include a reference to an identifier that is usable to determine where the data 110 is stored within the data store 114 and/or how to retrieve the data 110. As another example, the data 110 may, in a similar manner, include a reference to the enriched data 112. It should be noted that examples described herein are not necessarily implied to be mutually exclusive and there may be various embodiments that implement some or all examples described herein, as appropriate based on the context in which examples are disclosed. As yet another example, there may be a separate data structure (e.g., stored separately from both the data 110 and the enriched data 112) that encodes the binding or coupling between the data 110 and the enriched data 112 — for example, through the use of a database table that stores many mappings between data identifiers and enriched data identifiers. In some cases, rules for how data 110 and enriched data 112 are stored may differ. For example, the data 110 or portions thereof may be subject to expiration rules as to how long the data (or portions thereof) may be retained, whereas the enriched data 112 may be subject to different rules. Access to the data 110 and enriched data 112 via the data store 114 may be subject to the enforcement of authorization and/or authentication processes.

Techniques described in connection with FIG. 1 may be adapted to various computing environments, such as the use of various types of service providers and data producer systems. For example, the data enrichment service 104 may be adapted to be implemented in the context of a serverless compute service provider and/or an event-drive compute service. In an embodiment, the data producer system 108 is a client of a computing resource service provider that generates data and sends data to the computing resource service provider via a network such as the Internet. The data producer system may be a service of the computing resource service provider that generates data or otherwise makes data available. The data producer system may generate data such as logging data based on other events within the context of a computing resource service provider. Data enrichment techniques may be implemented in numerous contexts which may be given as non-limiting examples and should not be construed to be constraints. For example, in the context of streaming web server logs, data may be enriched to include the IP address of the client and field location data so that it will come into a data streaming service and the service would take it with geolocation information (e.g., state and/or country information) and write that out so that the web server log automatically has geolocation data. In a consumer-based application, such as an online marketplace, enriched data may be obtained from a secondary source when a consumer purchases an item from the online marketplace so that, for example, if a user purchases an umbrella, the purchase data may trigger a data enrichment service to query a weather service to determine the weather at the geolocation of the user, for example to determine whether the purchase of the umbrella is attributable to wet weather (e.g., thunderstorm or heavy rain).

The source of the data 110 and the enriched data 112 may be different, as described in various examples above. Different security permissions and/or policies may be enforced against the data 110 and the enriched data 112. For example, as part of enriching the data, the data enrichment service 104 may assume different roles for processing the data 110 and for obtaining the enriched data 112 from another source. Techniques described herein may be directed to a service that allows for customers to customize how to enrich data stream and enrich data generally, and in various embodiments customers are not required to generate source code or may need to provide only a minimal amount of source code (e.g., a SQL query or a small script). In some embodiments, the enrichment parameters are encoded in a JSON or XML format. The enrichment parameters may encode key-value pairs that, based on the presence or absence of certain keys, control which records of a data stream are processed for enrichment. The data enrichment service 104 may perform various routines that provision computing resources for provisioning, processing, determining, storing, etc., the enriched data. In various embodiments, customers are not required to setup and provision additional infrastructure for performing the data enrichment process and/or for storing the enriched data.

Figure 2:
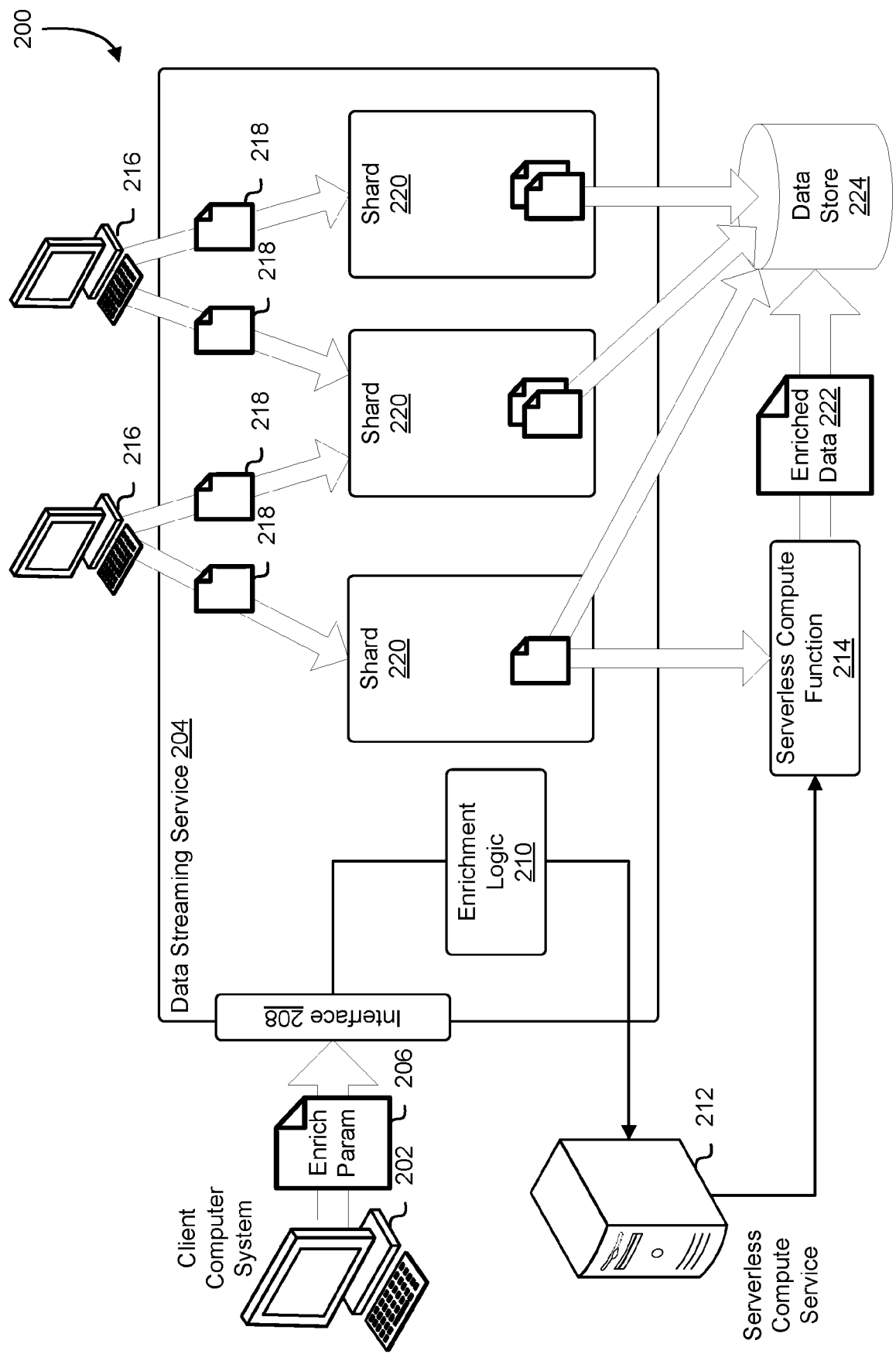
FIG. 2 shows an illustrative example of a computing environment in which a data stream is enriched, in accordance with at least one embodiment.

FIG. 2 shows an illustrative example of a computing environment 200 in which a data stream is enriched, in accordance with at least one embodiment. Various techniques, such as those discussed in connection with FIG. 1, may be utilized and/or adapted for use in embodiments that are in accordance with FIG. 2. In an embodiment, a client computer system 202 provides, to a data streaming service 204, enrichment parameters 206 that are used to enrich records flowing through a data stream that is processed by the data streaming service 204.

The client computer system 202 may be any suitable computing device and may be implemented in accordance with techniques described below in connection with FIGS. 1 and 6. The client computer system 202 may communicate with the data streaming service 204 using an interface 208 such as a web service application programming interface. The client computer system 202 may submit web API requests to the data streaming service 204 via a network such as the Internet. As part of setting up a data stream, the client computer system 202 may provide enrichment parameters 206 that are used to define when and how data is enriched as records flow through a data stream. The enrichment parameters 206 may be in accordance with those described in connection with FIG. 1.

In an embodiment, the enrichment parameters 206 are received by the data streaming service 204 via an interface (e.g., as a web service API request) and is parsed to determine enrichment logic 210. Enrichment logic 210 may refer to executable code, source code, applications, scripts, routines, function pointers, input parameters to a routine, callback functions, API requests, or any combination thereof. Enrichment logic 210 may be provided to a serverless compute service 212 or an event-driven compute service that executes a serverless compute function 214 in response to satisfaction of an event. The conditions for satisfaction may be encoded in the enrichment logic 210, for example, as a set of events or a binary statement that can evaluate to TRUE or FALSE. Enrichment logic 210 may refer to code that is generated from the enrichment parameters 206 provided by the client computer system 202. For example, the enrichment parameters 206 may be a JSON file that encodes a set of key value pairs indicating a key attribute that maps to a value attribute.

The enrichment logic 210 may be executed within a computing environment that is provisioned by the serverless compute service 212 in response to detecting satisfaction of a condition. Whether the condition is satisfied may be determined by parsing data records as they pass through respective shards, and certain shards (e.g., based on the presence or absence of certain attributes, based on the evaluation of code that inspects the data) cause the condition to be satisfied. In some cases, all data records satisfy the condition (e.g., in the case where all data records are to be enhanced). In an embodiment, the computing environment is provisioned by reserving compute resources and provisioning a computing environment using the reserved compute resources. For example, a compute service may be used to instantiate a virtual machine instance to setup operating system, applications, client SDKs, etc., that are used to execute the serverless compute function 214. The serverless compute function may be executed based at least in part on the enrichment logic 210. For example, the enrichment logic may include a SQL query such as a JOIN operation that is performed. The data record that caused satisfaction of the condition that initiated execution of the serverless compute function 214 may be utilized in connection with the query (e.g., joining the data of the data record with additional data). Once the serverless compute function 214 is executed, the computing environment may be de-provisioned, for example, by terminating a virtual machine instance.

The data streaming service 204 may refer to a service of a computing resource service provider that is utilized to ingest large amounts of data in real time and durably stores the data for consumption, in accordance with at least one embodiment. A data stream may refer to a representation of a group of records or data records. The data records of a data stream may be distributed across shards. A shard may refer to a sequence of data records in a stream. A data stream may have one or more shards, which can be configured by a client such as the client that creates the data stream. Each shard may have a capacity for data that can be processed, and a data stream can be scaled up (e.g., by adding shards) or scaled down (e.g., by reducing the number of shards) according to the amount of data flowing through the stream.

A data stream can be created in several ways, such as through a graphical user interface, through a web service API request, through a command line interface, etc., in accordance with at least one embodiment. In an embodiment a web service API request to create a stream. As an example, a client SDK supports creation of a stream using a class object such as CreateStreamRequest that implements one or more interfaces, extends one or more classes (e.g., a web service request base class that is used for requests to a computing resource service provider). For example, the CreateStreamRequest class may support various methods or routines such as setStreamName, setShardCount, and setEnrichmentParameters.

As a first example, consider setStreamName, which may have the following function signature:

```
public void setStreamName(String streamName)
```

The streamName string may refer to the name to identify the stream with. The stream name may be scoped to a particular account of the data stream service and/or the computing resource service provider. The data stream may be scoped to a particular region which may be identified based on a geolocation. For example, it may be possible for streams in two different accounts to have the same name. As a second example, two streams of the same account but in different regions may also have the same name.

As second example, consider setShardCount, which may have the following function signature:

```
public void setShardCount(Integer shardCount)
```

The shardCount integer may refer to the number of shards that the stream will be created with. Note that in various cases, the number of shards used by a data stream can be increased or decreased after initialization. The throughput of the stream may be a function of the number of shards.

As third example, consider setEnrichmentParameters, which may have the following function signature:

```
public void setEnrichmentParameters (Blob enrichmentParameters)
```

The enrichmentParameters blob may be refer to data that encodes the enrichment parameters. While a Blob is described for illustrative purposes, other data types may be utilized. For example, the enrichment parameters may be a key value pair that indicates a key value mappings for enriched data 222. As a second example, the enrichment parameters may be a string that encodes a network location or file path where a file (e.g., JSON or XML file) that encodes the enrichment parameters can be found. In an embodiment, the enrichment parameters encodes a blob of SQL code that can be used to run a query that, for example, performs a join, thereby generating enriched data.

Techniques described herein can be adapted to various computing environments and various use cases. For example, in the context of data being uploaded to a data storage service, transformations can be performed in connection with the upload request to enrich the data. Consider, as well, a data streaming system where data records 218 are continuously streamed by data producers 216 through one or more shards 220, the records may be provided to a data store and then joined (e.g., using SQL) and written to a data store 224, etc., and a customer can define enrichment parameters in any suitable format such as in a JavaScript Object Notation (JSON) or Extensible Markup Language (XML) format which can be used to determine executable code that is run on behalf of the customer to fetch additional data, thereby enriching the data stream. In some examples, a user may be streaming web server logs and the case for enrichment is that IP addresses of the client and location data are written out so that the web server log automatically has geolocation data attached to it. Of course, such use cases are open ended and not to be construed as limiting the scope of the invention. The data store 224 may be any suitable storage system, such as a data storage system or other system that durably stores data. The data store may be implemented in accordance with those described elsewhere in this disclosure, such as in connection with FIG. 1.

Figure 3:
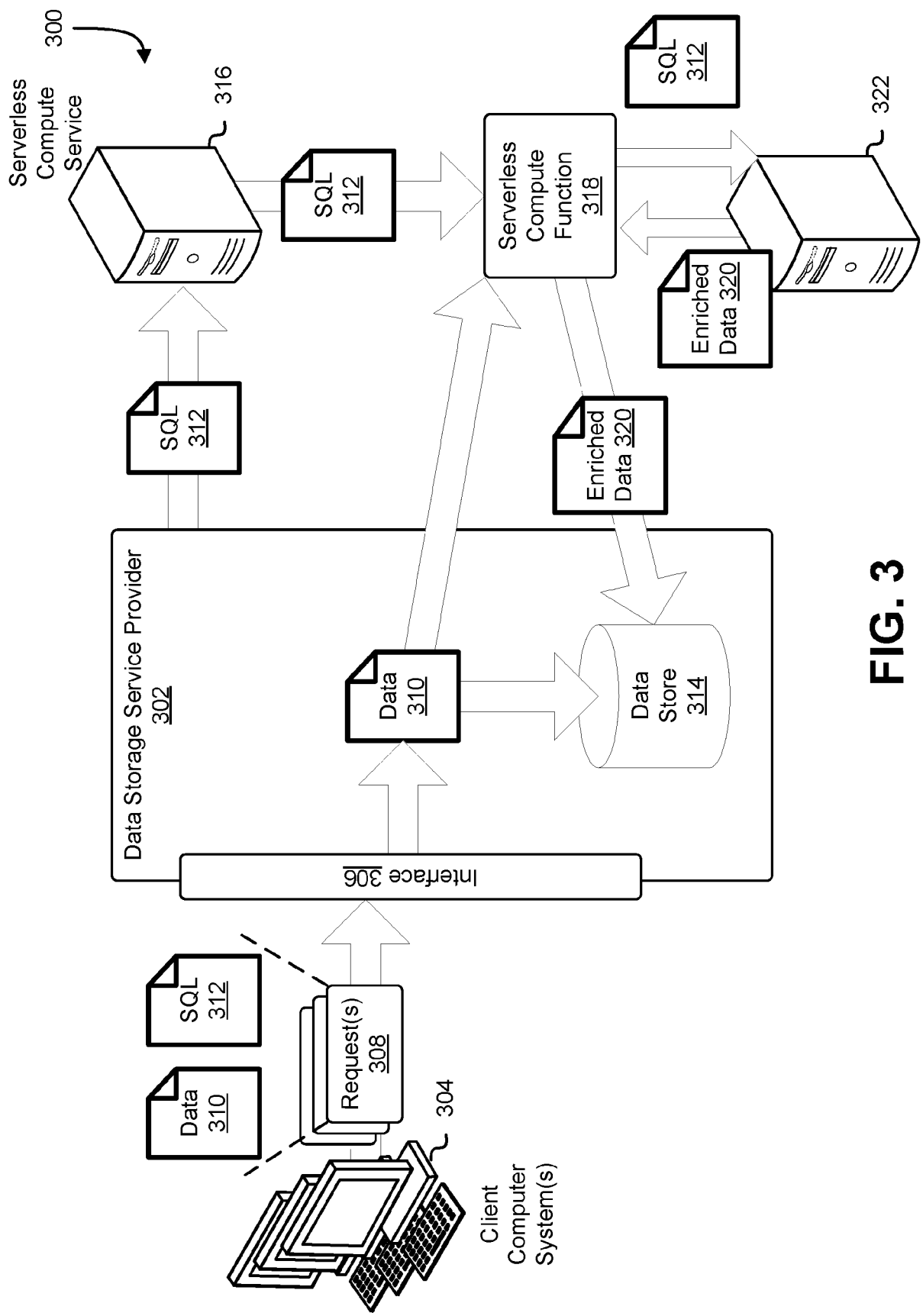
FIG. 3 illustrates a computing environment in which data enrichment is performed in the context of a data storage service provider, in accordance with at least one embodiment.

FIG. 3 illustrates a computing environment 300 in which data enrichment is performed in the context of a data storage service provider, in accordance with at least one embodiment. The data storage service provider 302 may be implemented in any suitable manner, such as in the manner described in connection with FIGS. 1 and 6. The data storage service provider 302 may be a web server or application server as discussed in connection with FIG. 6. The data storage service provider 302 and client computer systems 304 (e.g., one or more client computer systems) may establish a server-client relationship and communicate using a cryptographically protected communications session such as a TLS session. A cryptographically protected communications session may provide computationally verifiable assurances of authenticity, confidentiality, integrity, or any combination thereof. Authenticity may refer to assurances that a message was created by a party purporting to be the author of the message. Integrity may refer to assurances that a received message was not modified either intentionally (e.g., by a malicious party) or unintentionally (e.g., as a result of signal loss during transmission) from its original form when the message was transmitted. Confidentiality may refer to assurances that the data is encrypted or otherwise obfuscated. The client computer systems 304 may submit requests and commands via an interface 306 such as web service API requests.

A client computer system of the one or more client computer systems 304 may submit web service API requests, in various embodiments. As an example the client computer system may utilize a Java SDK to create a class object that submits a HTTP request on behalf of the client. The class object may, for example, include an operation that specifies parameters to upload a file to a specified bucket, key, and enrichment parameters:

```
public PutObjectRequest(String bucketName,
    String key,
    File file,
    EnrichmentParameters params)
```

The enrichment parameters may be encoded as any suitable data type, such as a string, data blob, or custom-defined struct. The file may refer to data or a data object to be stored. The key may refer to a key under which to store the new object (e.g., no two files within the same bucket may have the same key). The bucket name may refer to a bucket in which the data object is to be uploaded.

As a second example, the enrichment parameters may be specified after construction of the object as an optional parameter by using a method:

```
public PutObjectRequest withEnrichmentParameters(EnrichmentParameters param)
```

In this example, the enrichment parameters may be optionally specified after the construction of a put data object request and encodes instructions on how to enrich the uploaded data.

In various embodiments, the enrichment parameters can be encoded using different data types. The enrichment parameters may be a string (e.g., specifying a JSON file, specifying a SQL query to execute to determine enrichment data). In some embodiments, the enrichment parameters are provided by the client separately from the data and may be applicable to more than one piece of data. As an example, a separate web service API call may be used to bind the enrichment parameters to a bucket and is applicable to all subsequent requests to store data to that bucket (e.g., including or excluding buckets within the bucket).

A client of the data storage service provider 302 may submit a request of one or more requests 308 such as a web service API request to put or store a data object using the data storage service provider 302. In an embodiment, the request encodes data 310 to be stored (e.g., as a data object), a destination location to store the data object (e.g., encoded as a bucket name), and a set of enrichment parameters that can be used to determine and/or generate enriched data. As an example, the enrichment parameters may be a SQL code 312. In some embodiments, only one client computer system submits one or more requests 308 to the data storage service provider 302. In some embodiments, multiple client computer systems submit the requests 308 to the data storage service provider 302. In some embodiments, the enrichment parameters and the data are submitted as separate requests.

The data storage service provider 302 may receive requests 308 to store data and fulfill at least some of the requests by persisting the data 310 to a data store 314 that is controlled by the data storage service provider 302. The data store 314 may be any suitable storage medium such as a hard disk drive. The data storage service provider may further obtain the SQL code 312 from the request and submit the SQL code 312 to a serverless compute service 316. The serverless compute service 316 may be implemented according to those described elsewhere in this disclosure. The serverless compute service 316 may provision a computing environment to execute the SQL code. For example, the computing environment may include a virtual machine configured with a SQL server client. The computing environment may be utilized to execute a serverless compute function 318 using the SQL code 312. The data 310 may also be utilized as part of execution of the serverless compute function 318. For example, the serverless compute function may perform a JOIN operation that combines the data 310 with additional data, thereby generating the enriched data 320. The enriched data may refer to a result of execution of the serverless compute function 318. The SQL code 312 may be executed and a query may be made to a SQL server 322 which produces a result that is the enriched data 320. In some embodiments, the data 310 is persisted by storing the data on one or more storage mediums that are owned, controlled, and operated by the computing resource service provider. In some embodiments, the data storage service provider 302 utilizes storage mediums that are owned and controlled by another entity, such as the organization for which the one or more client computer systems 304 is enriching the data on behalf. In some cases, the organization may have policies in place for how data may be shared externally (e.g., with the computing resource service provider) and, according to those policies, the data 310 may be stored (e.g., solely) on storage devices owned and controlled by the organization, on storage devices of the computing resource service provider, or a combination of both.

Once persisted, the data 310 and the enriched data 320 may be accessed via the interface 306, according to at least one embodiment. For example, a subsequent request to access the data using a key to identify the data may be made by a client of the data storage service provider 302, which may be the same client that provided the data or a different client (not illustrated in FIG. 3). There may be a security policy and/or a set of permissions associated with the data object and/or the requesting client (also referred to as a requestor) that is evaluated to determine whether to provide the data in response to the request. In an embodiment, there is a first set of permissions that is evaluated to determine authorization to access the data 310 and a second set of permissions that is evaluated to determine authorization to access the enriched data 320. For example, the enriched data 320 may be accessible to a different set of users or principals, such as administrators, auditors, security experts, and the like. In an embodiment, access to the enriched data 320 is recorded in logs — for example, the enriched data 320 may be provided to a client computer system of the one or more client computer systems 304 so that the client may retrieve archival information that is no longer accessible to the user due to the data or other environment variables changing over time. In such a case, the user may be billed for each access to the enriched data, the amount of which may be based on the compute time to generate the enriched data.

Figure 4:
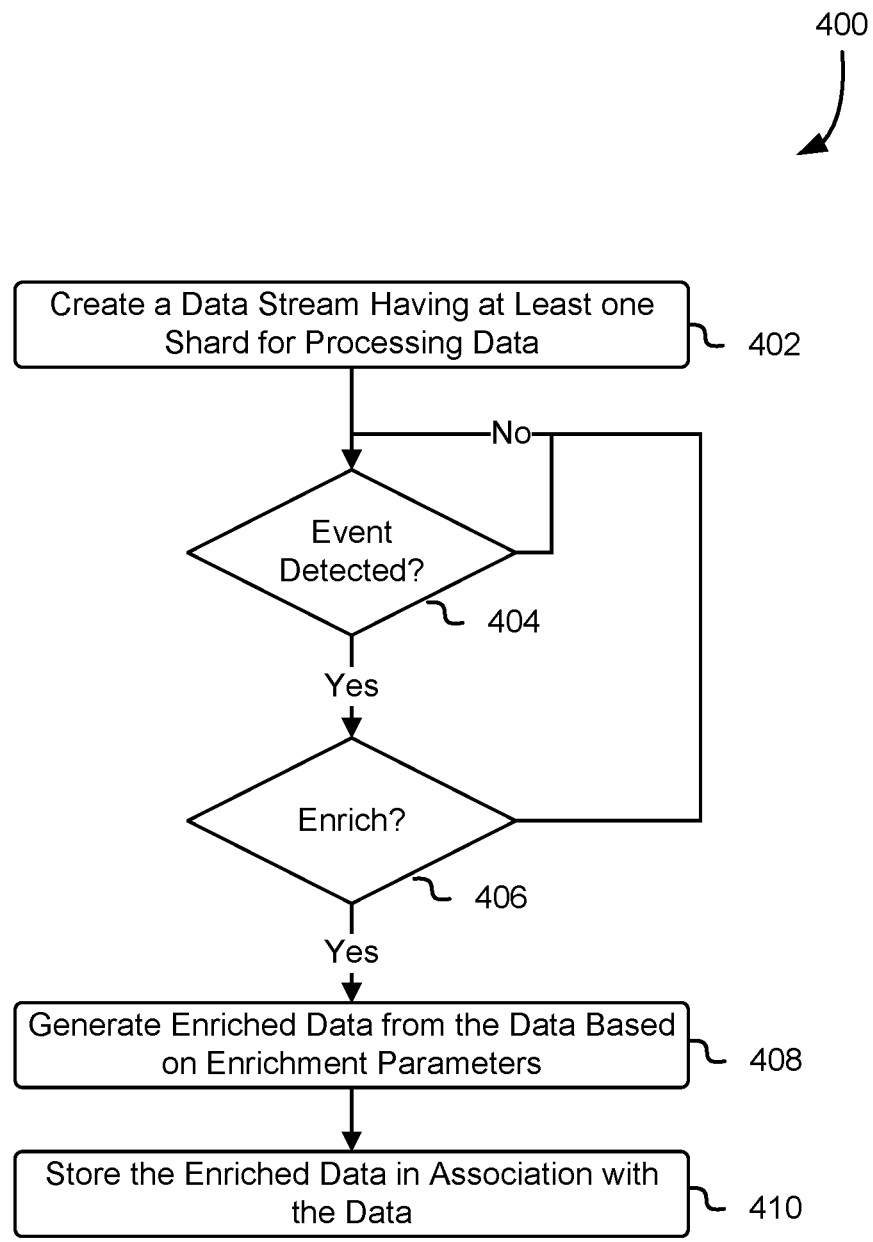
FIG. 4 shows an illustrative example of a process for enriching a data stream in accordance with an embodiment.

FIG. 4 shows an illustrative example of a process 400 for enriching a data stream in accordance with an embodiment. Some or all of the process 400 (or any other processes described herein, or variations and/or combinations thereof) may be performed under the control of one or more computer systems configured with computer-executable instructions and may be implemented as code (e.g., computer-executable instructions, one or more computer programs, or one or more applications) executing collectively on one or more processors, by hardware, software, or combinations thereof. The code may be stored on a computer-readable storage medium, for example, in the form of a computer program comprising a plurality of computer-readable instructions executable by one or more processors. The computer-readable storage medium may be a non-transitory computer-readable medium. In some embodiments, at least some of the computer-readable instructions usable to perform the process 400 are not stored solely using transitory signals (e.g., a propagating transient electric or electromagnetic transmission). A non-transitory computer-readable medium may include non-transitory data storage circuitry (e.g., buffers, caches, and queues) within transceivers of transitory signals. The process 400 may be performed by any suitable system, such as a data streaming service discussed in connection with FIG. 2.

In an embodiment, a system such as a data streaming service performs the process 400 or a portion thereof. The system may create 402 a data stream having at least one shard for processing data. The data stream may be created in response to a web service API request from a client computer system that includes an enrichment parameter in the initial request to create the data stream or at some point afterwards as part of a second request to begin enrichment or modify existing enrichment parameters.

The system may, upon creation of the data stream, monitor whether 404 an event is detected. The event may be in accordance with those discussed elsewhere, such as in connection with FIG. 1. The event may, in the context of a data streaming service, be detected when a data producer provides a data record to a shard. If an event is not detected, the system may continue to monitor for events to be received in the data pipe.

In response to detecting an event, the system may further determine whether 406 to enrich data associated with the event. Eligibility for enrichment may be determined based on the enrichment parameters. For example, if a certain attribute or field is present in the data record, the data may be enriched, as indicated by the enrichment parameters. The enrichment parameters may include a script or code that is executed and evaluated against the data record to determine a Boolean value indicating whether to perform an enrichment of the data. If the data is determined to not be eligible for enrichment, the system may continue to monitor for additional events and determine whether those subsequent events are eligible for data enrichment.

If the data is eligible for data enrichment, the system may generate 408 enriched data from the data based on enrichment parameters. The enrichment parameters may be obtained when the data stream is created or as part of a subsequent modification of the data stream. Data enrichment can be performed using techniques described elsewhere in this disclosure. Once the enriched data is generated, it may be stored 410 in association with the data from the data stream, such as in the manner described below in connection with FIG. 5.

Figure 5:
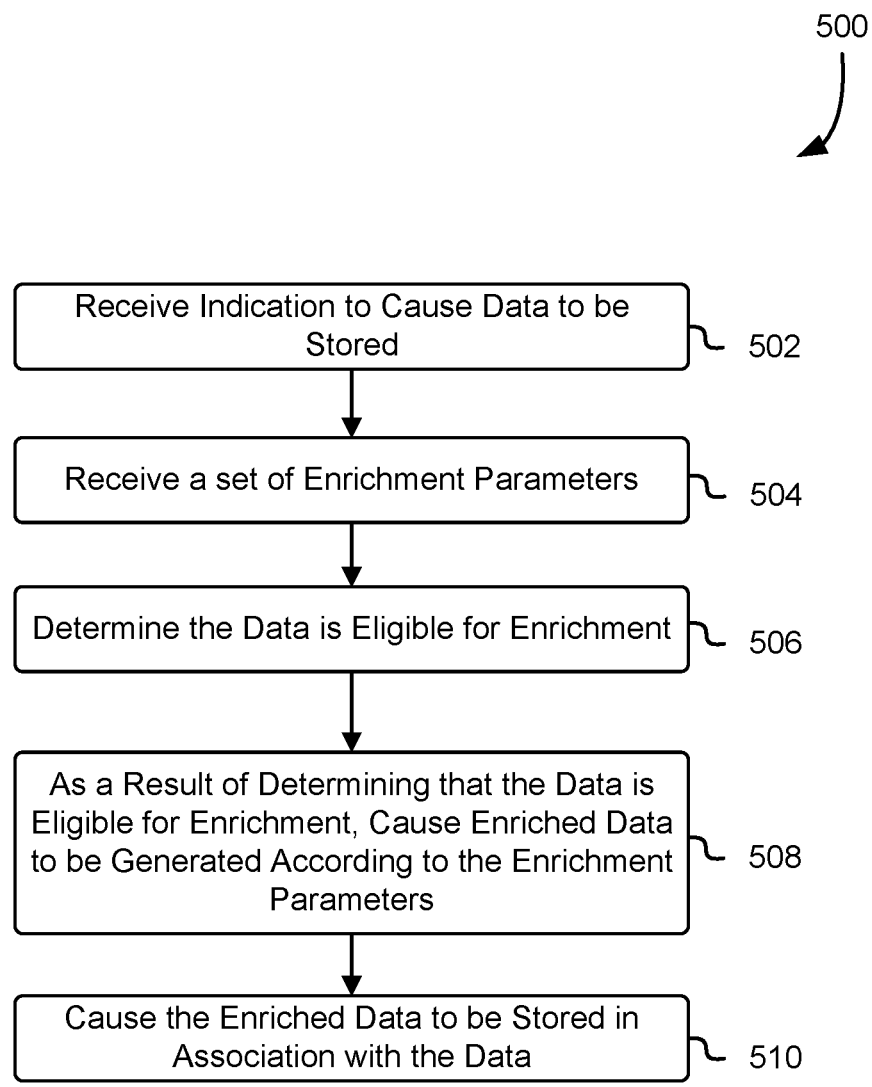
FIG. 5 shows an illustrative example of a process for data enrichment as a service, in accordance with an embodiment.

FIG. 5 shows an illustrative example of a process 500 for data enrichment as a service, in accordance with an embodiment. Some or all of the process 500 (or any other processes described herein, or variations and/or combinations thereof) may be performed under the control of one or more computer systems configured with computer-executable instructions and may be implemented as code (e.g., computer-executable instructions, one or more computer programs, or one or more applications) executing collectively on one or more processors, by hardware, software, or combinations thereof. The code may be stored on a computer-readable storage medium, for example, in the form of a computer program comprising a plurality of computer-readable instructions executable by one or more processors. The computer-readable storage medium may be a non-transitory computer-readable medium. In some embodiments, at least some of the computer-readable instructions usable to perform the process 500 are not stored solely using transitory signals (e.g., a propagating transient electric or electromagnetic transmission). A non-transitory computer-readable medium may include non-transitory data storage circuitry (e.g., buffers, caches, and queues) within transceivers of transitory signals. The process 500 may be performed by any suitable system, such as by a data enrichment service discussed in connection with FIG. 1, a data streaming service discussed in connection with FIG. 2, a data storage service provider as discussed in connection with FIG. 3, and more.

The system performing the process 500, in an embodiment, receives 502 an indication to cause data to be stored. The indication may be received as, or as a part of, a web service application programming interface (API) command or request, such as a web server API request to store a data object in a container. A service provider of a computing resource service provider may receive the indication to cause the data to be stored. For example, a data storage service provider may receive a web API request to upload and persist a data object to a container or network location. In some cases, a client of a service provider submits data (e.g., a data object) as part of a request to store the data.

In some cases, the indication to cause the data to be stored is an indication for subsequently detected data to be stored. As an example, a client computing device may submit a web service API request to a data streaming service to monitor logging data that passes through the data streaming service (e.g., passes through shards of the data streaming service. Shards may receive data traffic that is processed and enriched. In an embodiment, the indication to cause data to be stored is a request to begin monitoring a data stream, and subsequently, data that passes through the data stream is analyzed and enrich.

The system may receive 504 a set of enrichment parameters. The enrichment parameters may, in some cases, be received with the indication to cause the data to be stored — for example, a web service API request may include both the indication to cause the data to be stored as well as the set of enrichment parameters. In an embodiment, a data storage request encodes data to be stored (e.g., as a data object), a destination location to store the data object (e.g., encoded as a bucket name), and a set of enrichment parameters that can be used to determine and/or generate enriched data. The enriched data may be generated based on the data, the request, or other related information. The indication to cause data to be stored may, in some cases, be inferred from the request, the presence of data to be stored, and is not necessarily an explicit parameter of a web service API request.

The enrichment parameters may be in accordance with those described elsewhere in this disclosure, such as those discussed in connection with FIGS. 1-3. In an embodiment, the enrichment parameters include a key-value mapping that identifies attributes which, if present in the data to be stored, cause the generation of enriched data according to the mapping (e.g., storing another attribute as enriched data based on the mapping). The enrichment parameters may be encoded in a human-readable format such as JSON or XML. In an embodiment, the enrichment parameters include executable code or commands. The enrichment parameters, in an embodiment, include a SQL query that is executed in response to detecting data to be stored and the result of the SQL query or a portion thereof is the enriched data. In an embodiment, the result of the SQL query includes both the data and the enriched data. A SQL query may, for example, specify a JOIN clause that joins the data (e.g., the data to be stored, represented as rows and/or columns of a database) with other data (e.g., from another database table), thereby generating a result that includes both the data to be stored and the enriched data. The result may be stored in a contiguous block of data within a storage medium, the contiguous organization of the data referring to either logical and/or physical continuity.

The system, in an embodiment, determines 506 the data is eligible for enrichment. In some embodiments, the system determines whether the data is eligible for enrichment based on the information included in the data itself (e.g., whether a particular attribute as specified by a key-value mapping is present in or absent from the data). In some cases, the determination of whether data is eligible for enrichment is determined based on context surrounding the data, such as information determined based on a request that is associated with the data — for example, the time that a request to store the data was made, the geolocation or IP address of the request to store the data, whether the request to store the data was received across an external network (e.g., as opposed to within an Intranet), and more. In some cases, all data, such as all data records passing through a data stream, are eligible for enrichment. In some embodiments, the content of the data is analyzed to determine whether the data is eligible for enrichment. In some embodiments, other information such as the request context causing the data to be stored is inspected to determine eligibility. Eligibility may be determined based on various criteria. For example, the enrichment parameters may include a Boolean expression that can be evaluated using candidate data to determine whether the candidate data is eligible for enrichment.

In an embodiment, as a result of determining that the data is eligible for enrichment, the system 508 causes enriched data to be generated according to the enrichment parameters. The system may cause enriched data to be generated by triggering a serverless compute service to execute a serverless compute function to generate the enriched data. The serverless compute service may be triggered by making a web service API call to the serverless compute service, the call including a function to execute (e.g., arbitrary code provided as part of the enrichment parameters), as well as additional information (e.g., a data record that is to be enriched). In some embodiments, the system itself determines and generates the enriched data. Generating the enriched data may include, for example, executing a SQL query encoded in the enrichment parameters and using the result of the SQL query, or a portion thereof, as the enriched data.

In an embodiment, the system causes 510 the enriched data to be stored in association with the data. In an embodiment, the system causes a data storage service provider to store the enriched data. In some cases, such as where the system is a data storage service provider, the system causes the enriched data to be stored by persisting it to a storage medium such as a hard disk drive controlled by the system. The enriched data may be stored in association with the data by including, in the enriched data, metadata that references a network location of the data. In an embodiment, the enriched data and the data are data objects that are stored in a same destination bucket having the same name but different extensions. For example, the data object may be named "example_dataobject.dat" and the enriched data object may be named "example_dataobject.datr" or other variations. In an embodiment, the data and the enriched data are database records such that the enriched data is added as an additional column to a database table in which the data is stored. In an embodiment, the enriched data is stored in a separate database table and a reference (e.g., in the first table to the second table or vice versa) is used to maintain the association between the data and the enriched data.

In some embodiments, a serverless compute service may be utilized to perform data enrichment. For example, in an embodiment, the system is a service provider that invokes a serverless compute service to perform enrichment logic as part of execution of a serverless compute function. The serverless compute service may be configured to provision a computing environment using a set of computing resources controlled by the serverless compute service. The serverless compute service may, for example, utilize a container as a sandbox that isolates the execution of enrichment logic. In an embodiment, the computing resources include compute instances such as virtual machine instances. The serverless compute service may use the set of computing resources to execute a serverless compute function, execution of the serverless compute function resulting in generation of the enriched data based on the enrichment parameters and the determination that the data is to be stored. The provisioning of the computing environment may make the set of computing resources suitable for executing a serverless compute function, which may include execution of the enrichment logic. Provisioning the computing environment may include the allocation of computing resources, configuring a virtual machine instance to setup operating system, applications, client SDKs, etc., that are used to execute the enrichment logic. For example, if the enrichment logic includes SQL code, the provisioning the computing environment may include setting up a SQL server client on a virtual machine instance that is setup to execute the enrichment logic. Once the serverless compute function (e.g., enrichment logic) is executed, the computing environment may be de-provisioned, for example, by terminating a virtual machine instance and making those resources available for other uses.

Examples of serverless compute services include AWS Lambda, Google Cloud Functions, IBM Cloud Functions, Fn or Fn Project, platform-as-a-service service providers, and more. A serverless compute service may be serverless in the sense that computing resources are dynamically allocated to perform functions (also referred to as serverless compute functions, serverless functions, Lambda functions) triggered by the events such as invocation of an endpoint from a client (e.g., a web API call via a network such as the Internet). In an embodiment, a serverless compute function is triggered when a serverless compute endpoint is invoked and computing resources in which the function can run are provisioned in response to the trigger being detected. The computing resources may be in accordance with a computing environment that is suitable to execute the function. The computing resources can be physical, which may include physical server computers, or virtual, which may include virtual machines. For example, if the function being triggered is written in the Java programming language, the serverless compute service may allocate a Java Virtual Machine as the resource to run the coded function. Similarly, other programming languages may be supported. The allocation of computing resources is the scope of the function may be based on various factors including but not limited to attributes such as timeout duration, memory usage, and temporary storage requirements. Based on these requirements, a serverless compute service may provision greater or fewer computing resources for the execution of the serverless compute function.

In an embodiment, a serverless compute service is scalable. In an embodiment, computing resources allocated by a serverless compute service for execution of a serverless compute function scale according to the load requirements of the function being run. As a serverless compute service causes the execution of a serverless compute function, if the initial requirements change, such as memory usage, and temporary storage requirements, the serverless compute service may detect the increase in usage and allocation additional resources to the temporary runtime environment in which the function is running, or utilize a device such as a load balancer to determine how to allocate and free computing resources. In the case of a load balancer, for example, the serverless compute service may add more physical servers to balance the load requirements of a function to run across multiple computing resources. In an embodiment, when a function finishes executing in a serverless compute environment, the serverless compute service de-provisions or frees the resources that were allocated to run the function. Accordingly, in some embodiments, compute resources are not necessarily allocated for serverless compute functions (e.g., serverless compute endpoints) in an idle state, thereby improving the operation of a computer system by reducing the use of computing resources by the computer system. In some embodiments, computing resources utilized by a serverless compute function are not necessarily de-provisioned upon execution of the function — for example, if the function being run is utilized frequently, the serverless compute service may keep the resources "warm", meaning the original settings of memory and temporary storage, as well as any initialization code, are retained so that when the function is run again, the same runtime environment can be utilized, and initialization functions can be skipped, resulting in a more efficient repeated execution of the function. As the rate of requests to execute the function decrease, the computing resources may be deprovisioned, thereby relinquishing those resources and making them available to be used in the execution of other serverless compute functions.

Figure 6:
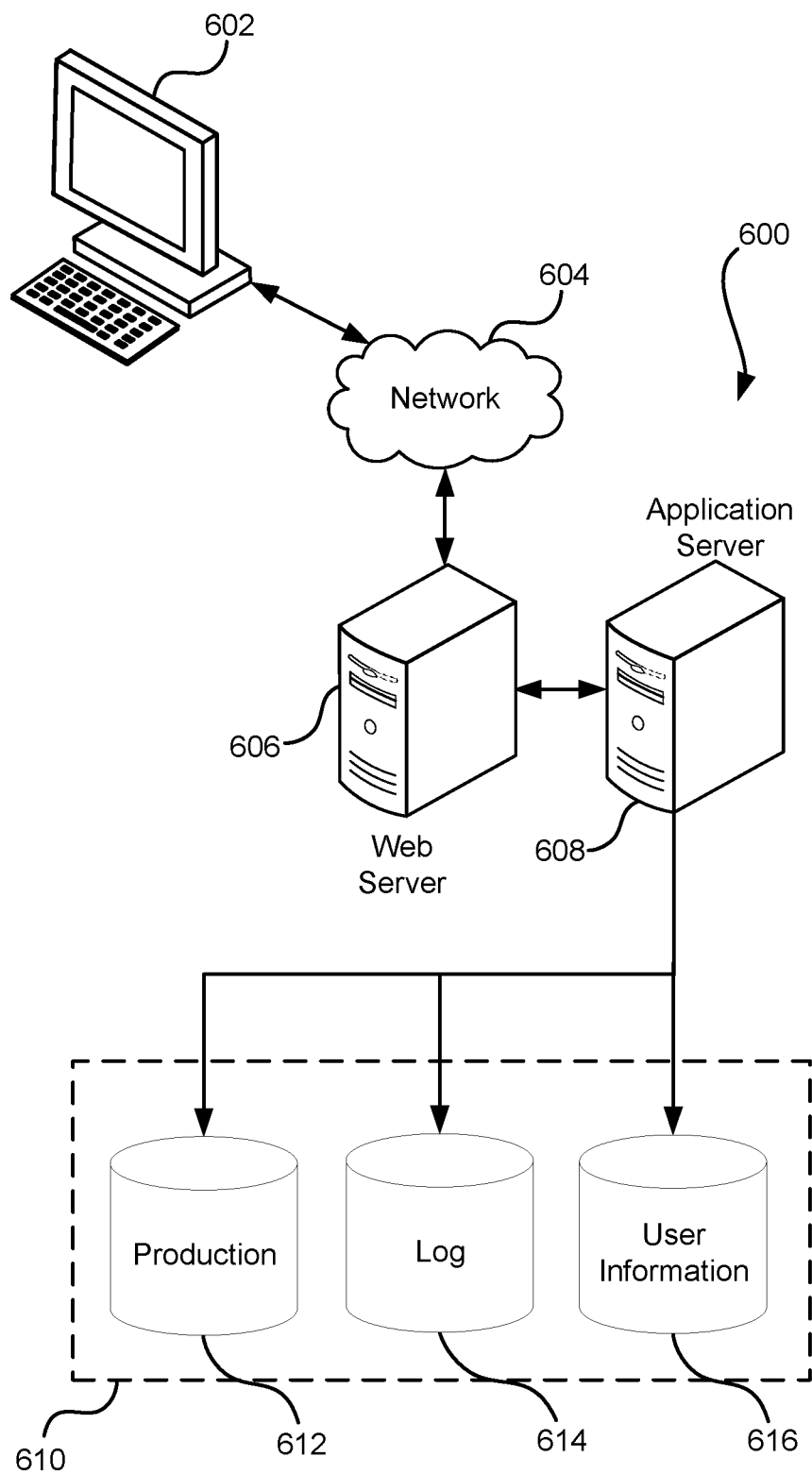
FIG. 6 illustrates a system in which various embodiments can be implemented.

FIG. 6 illustrates aspects of an example system 600 for implementing aspects in accordance with an embodiment. As will be appreciated, although a web-based system is used for purposes of explanation, different systems may be used, as appropriate, to implement various embodiments. In an embodiment, the system includes an electronic client device 602, which includes any appropriate device operable to send and/or receive requests, messages, or information over an appropriate network 604 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 606 for receiving requests and serving content in response thereto, although for other networks an alternative device serving a similar purpose could be used as would be apparent to one of ordinary skill in the art.

In an embodiment, the illustrative system includes at least one application server 608 and a data store 610 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 602 and the application server 608, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 610, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 612 and user information 616, which are used to serve content for the production side. The data store also is shown to include a mechanism for storing log data 614, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 610.

The data store 610, in an embodiment, is operable, through logic associated therewith, to receive instructions from the application server 608 and obtain, update or otherwise process data in response thereto and the application server 608 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 602. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 600 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 600, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 6. Thus, the depiction of the system 600 in FIG. 6 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization, and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors — for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    receiving, from a client computer system, an application programming interface (API) request comprising:
        data to be stored, a set of enrichment parameters that encodes rules for determining enriched data to be stored in association with the data, and
        a context for storage of the data, the context comprising an event and a type of the data;
    in response to the API request, determining, based on the set of enrichment parameters, enrichment logic that comprises executable code and encodes one or more conditions specified in the enrichment logic for execution of the enrichment logic; and
    in response to determining the data is to be stored, and based at least in part on the context, executing instructions that cause a serverless compute service to:
        detect satisfaction of the one or more conditions for execution of the enrichment logic;
        as a result of detecting the satisfaction of the one or more conditions for the execution of the enrichment logic, allocate a set of computing resources to provision a computing environment controlled by the serverless compute service, the computing environment usable to execute the enrichment logic as a serverless compute function;
        use the set of computing resources to execute the serverless compute function, thereby generating the enriched data;
        store the enriched data in association with the data; and
        as a result of generating the enriched data, de-provision the set of computing resources.

2. The computer-implemented method of claim 1, wherein:
    a data streaming service of a computing resource service provider receives the API request comprising the data to be stored, the data streaming service supporting one or more shards each having a capacity for processing a sequence of records and supporting storage of the records to a data store; and
    the data to be stored is a record of the sequence of records.

3. The computer-implemented method of claim 1, wherein the set of enrichment parameters indicate one or more key-value mappings of the data to the enriched data, the one or more key-value mappings used to determine the one or more conditions as a presence or an absence of a data field in the data.

4. A system, comprising:
    one or more processors; and memory that stores computer-executable instructions that, as a result of execution by the one or more processors, cause a computing resource service provider of the system to:

receive an application programming interface (API) request comprising data to be stored and encoding enrichment parameters for enriching the data;

determine, from the enrichment parameters, enrichment logic that comprises executable code and encodes one or more conditions specified by the enrichment parameters, wherein the enrichment logic is based at least in part on context of the API request, the context comprising an event and a type of the data;

in response to the API request, execute the enrichment logic as a serverless compute function using a set of computing resources allocated by a serverless compute service, wherein execution of the enrichment logic further causes the system to:

detect satisfaction of the one or more conditions;

identify the data received by the service provider that is eligible for enrichment according to the one or more conditions and the context of the API request;

as a result of detecting the satisfaction of the one or more conditions and identifying that the data is eligible for enrichment, cause enriched data to be generated according to the executable code; and cause the enriched data to be stored in association with the data.

5. The system of claim 4, wherein:

the enrichment parameters include Structured Query Language (SQL) code; and the computer-executable instructions that cause the enriched data to be generated comprise instructions that, as a result of execution by the one or more processors, cause the system to execute the SQL code, the enriched data being a result of execution of the SQL code.

6. The system of claim 5, wherein the SQL code includes a JOIN clause.

7. The system of claim 4, wherein the computer-executable instructions that cause the enriched data to be generated according to the enrichment parameters include instructions that, as a result of execution by the one or more processors, cause the system to:

submit, to another computer system, a second request for external data, the second request determined based on the data and the enrichment parameters, wherein the enrichment parameters identify the other computer system; and receive, as part of a response to the second request, the enriched data from the other computer system.

8. The system of claim 4, wherein:

the computer-executable instructions that cause the enriched data to be generated according to the enrichment parameters include instructions that, as a result of execution by the one or more processors, cause the system, at the serverless compute service to:

provision a computing environment using the set of computing resources controlled by the serverless compute service;

use the set of computing resources to execute the serverless compute function, execution of the serverless compute function resulting in generation of the enriched data based on the enrichment parameters and the identification that the data is eligible for enrichment; and based on the generation of the enriched data, de-provision the set of computing resources; and the computer-executable instructions that cause the enriched data to be stored in association with the data include instructions that, as a result of execution by the one or more processors, cause the system, at the serverless compute service, to store the enriched data.

9. The system of claim 4, wherein:

the data and the enriched data are stored in a data storage service;

the data is accessible via the data storage service according to a first set of permissions; and the enriched data is accessible via the data storage service according to a second set of permissions that is different from the first set of permissions.

10. The system of claim 4, wherein the enriched data comprises a set of permissions associated with or used to access the data.

11. The system of claim 4, wherein the computer-executable instructions that cause the enriched data to be stored in association with the data include instructions that, as a result of execution by the one or more processors, cause the system to store the data and the enriched data contiguously.

12. One or more non-transitory computer-readable storage media collectively having stored thereon executable instructions that, as a result of being executed by one or more processors of a computer system, cause the computer system to at least:

receive, at a service provider of a computing resource service provider, an application programming interface (API) request comprising data to be stored, a set of enrichment parameters for enriching the data, and a context for storage of the data, the context comprising an event and a type of the data;

determine, based on the set of enrichment parameters, enrichment logic comprising executable code encoding one or more conditions;

determine whether data obtained by the service provider is eligible for enrichment, based at least in part on the one or more conditions and the context;

in response to satisfaction of the one or more conditions and based at least in part on the context, cause the executable code to be executed as a serverless compute function, thereby generating enriched data, wherein the executable code is executed based at least in part on one or more computing resources allocated by a serverless compute service as a result of the satisfaction of the one or more conditions; and cause the enriched data to be stored in association with the data.

13. The one or more non-transitory computer-readable storage media of claim 12, wherein:

the service provider is a data storage service provider; and the instructions further comprise instructions that, as a result of being executed by the one or more processors, cause the computer system to:

receive the API request to store the data, wherein the API request encodes the data with the set of enrichment parameters; and persist, to a network location specified by the API request, at least the data to a storage medium controlled by the data storage service provider.

14. The one or more non-transitory computer-readable storage media of claim 13, wherein the executable instructions that cause the computer system to cause the data to be enriched according to the set of enrichment parameters include instructions that cause the computer system to cause the data storage service provider to determine the enriched data according to the set of enrichment parameters.

15. The one or more non-transitory computer-readable storage media of claim 13, wherein the data is a data object and the API request encodes:
- a destination bucket name to store the data object;
- a key under which to store the data object;
- information usable to determine the data, the information including the context; and
- the set of enrichment parameters.

16. The one or more non-transitory computer-readable storage media of claim 12, wherein the executable instructions further comprise instructions that, as a result of being executed by the one or more processors, cause the computer system to cause the data to be deleted according to a retention policy, wherein the enriched data lacks being subjected to the retention policy.

17. The one or more non-transitory computer-readable storage media of claim 12, wherein the enriched data is a machine-learning model.

18. The one or more non-transitory computer-readable storage media of claim 12, wherein the enriched data comprises an IP address associated with the API request that the data is obtained from.

19. The one or more non-transitory computer-readable storage media of claim 12, wherein the executable instructions further comprise instructions that, as a result of being executed by the one or more processors, cause the computer system to:
- provide the enriched data in response to the API request; and
- as a result of providing the enriched data, record logging information associated with the API request, the logging information including at least a computing entity attributed to retrieval of the enriched data.

* * * * *